(12) United States Patent
Ikenishi

(10) Patent No.: US 8,198,202 B2
(45) Date of Patent: *Jun. 12, 2012

(54) OPTICAL GLASS, GLASS MATERIAL FOR PRESS MOLDING, OPTICAL ELEMENT BLANK, OPTICAL ELEMENT AND MANUFACTURING METHOD THEREOF

(75) Inventor: Mikio Ikenishi, Tokyo (JP)

(73) Assignee: Hoya Corporation, Tokyo (JP)

( * ) Notice: Subject to any disclaimer, the term of this patent is extended or adjusted under 35 U.S.C. 154(b) by 262 days.

This patent is subject to a terminal disclaimer.

(21) Appl. No.: 12/475,070

(22) Filed: May 29, 2009

(65) Prior Publication Data

US 2009/0298668 A1 Dec. 3, 2009

(30) Foreign Application Priority Data

May 30, 2008 (JP) ................................ 2008-142950

(51) Int. Cl.
*C03C 3/247* (2006.01)
*C03B 11/00* (2006.01)

(52) U.S. Cl. ................................ 501/44; 65/64; 65/102

(58) Field of Classification Search .................... 501/44; 65/64, 102
See application file for complete search history.

(56) References Cited

U.S. PATENT DOCUMENTS

| | | | |
|---|---|---|---|
| 4,990,468 A | 2/1991 | Komiya et al. | |
| 7,595,272 B2 * | 9/2009 | Ikenishi et al. | 501/48 |
| 2006/0223689 A1 * | 10/2006 | Ikenishi et al. | 501/45 |
| 2007/0027017 A1 * | 2/2007 | Hachitani | 501/47 |
| 2007/0060464 A1 * | 3/2007 | Ikenishi et al. | 501/48 |
| 2007/0096067 A1 * | 5/2007 | Zou et al. | 252/587 |
| 2008/0132400 A1 * | 6/2008 | Hachitani | 501/44 |
| 2009/0247386 A1 * | 10/2009 | Ikenishi | 501/44 |
| 2009/0247387 A1 * | 10/2009 | Ikenishi | 501/44 |
| 2009/0247388 A1 * | 10/2009 | Ikenishi | 501/44 |
| 2009/0314033 A1 * | 12/2009 | Zou et al. | 65/60.1 |
| 2009/0325774 A1 * | 12/2009 | Ikenishi | 501/30 |
| 2010/0113247 A1 * | 5/2010 | Ikenishi | 501/44 |

FOREIGN PATENT DOCUMENTS

| | | |
|---|---|---|
| DE | 4132258 | 11/1992 |
| EP | 0364150 | 4/1990 |
| EP | 0371716 | 6/1990 |
| JP | 01286935 | 11/1989 |
| JP | Hei 4-43854 | 7/1992 |
| JP | 11060267 | 3/1999 |
| JP | 2003/160356 | 6/2003 |
| JP | 2003160356 A * | 6/2003 |
| SU | 382586 | 5/1973 |
| WO | WO 2007114172 A1 * | 10/2007 |
| WO | WO - 2008/004648 | 1/2008 |

* cited by examiner

*Primary Examiner* — Karl Group
*Assistant Examiner* — Elizabeth A Bolden
(74) *Attorney, Agent, or Firm* — Formmer Lawrence & Haug LLP

(57) ABSTRACT

A fluorophosphate glass containing: $P^{5+}$ in an amount of 20 to 45 cationic %; $Al^{3+}$ in an amount of 15 to 35 cationic %; $Ba^{2+}$ in an amount of 20 to 50 cationic %; $F^-$ in an amount of 20 to 50 anionic %; and $O^{2-}$ in an amount of 50 to 80 anionic %. A molar ratio of $O^{2-}/P^{5+}$ is larger than or equal to 3.5. In addition, a molar ratio of $Al^{3+}/P^{5+}$ is larger than or equal to 0.45. Furthermore, the Abbe number (vd) of the glass is larger than or equal to 66. Finally a refractive index (nd) of the glass satisfies an expression (1): $nd \geq 2.0614 - 0.0071 \times vd$.

12 Claims, 4 Drawing Sheets

OPTICAL GLASS, GLASS MATERIAL FOR PRESS MOLDING, OPTICAL ELEMENT BLANK, OPTICAL ELEMENT AND MANUFACTURING METHOD THEREOF

The present application claims priority from Japanese Patent Application No. P2008-142950, filed on May 30, 2008, the disclosure of which is incorporated herein by reference in its entirety.

BACKGROUND OF THE INVENTION

1. Field of the Invention

The present invention relates to optical glass and, more particularly, optical glass having low dispersion and anomalous dispersion, glass material for press molding formed of the glass, an optical element blank, an optical element and manufacturing methods thereof.

2. Description of Related Art

It has been known that, since fluorophosphate glass has low dispersion and anomalous dispersion, fluorophosphate glass can be suitably used as material for lenses used for correction of high-order chromatic aberration. Japanese Examined Patent Application Publication No. HEI 4-43854B (hereafter, referred to as JP HEI 4-43854B) discloses fluorophosphate glass having low dispersion as well as a high refractive index.

However, such low dispersion glass has drawbacks. In particular, since the fluorophosphate glass exhibits a remarkably high degree of volatility in a molten state, it is difficult to obtain glass having a high degree of optical homogeneity from the fluorophosphate glass. Also, although the glass disclosed in JP HEI 4-43854B has excellent anomalous dispersion, the glass still has room for improvement of the thermal stability. Regarding glass whose thermal stability is low, it is necessary to increase the temperature of flowing molten glass to prevent the glass from losing clarity when the molten glass is molded. In this case, the volatilization is promoted. Therefore, it becomes more and more difficult to obtain the glass having the high degree of thermal stability.

SUMMARY OF THE INVENTION

According to the present invention, by enhancing the thermal stability while maintaining a high refractive index and suppressing the volatility of glass, it becomes possible to stably supply high quality fluorophosphate glass and to contribute to popularization of high performance optical devices which utilize such a property of fluorophosphate glass.

The present invention is advantageous in that it provides optical glass made of fluorophosphate glass which has a high refractive index, low dispersion, and excellent thermal stability, and which is made to suppress volatility. The present invention also provides glass material for press molding and an optical element made of the optical glass described above. In addition, the present invention provides manufacturing methods for the optical glass, the glass material for press molding, and the optical element.

According to one embodiment of the invention, there is provided fluorophosphate glass containing:
  $P^{5+}$ in an amount of 20 to 45 cationic %;
  $Al^{3+}$ in an amount of 15 to 35 cationic %;
  $Ba^{2+}$ in an amount of 20 to 50 cationic %;
  $F^-$ in an amount of 20 to 50 anionic %; and
  $O^{2-}$ in an amount of 50 to 80 anionic %;
  wherein:
  a molar ratio of $O^{2-}/P^{5+}$ is larger than or equal to 3.5;
  a molar ratio of $Al^{3+}/P^{5+}$ is larger than or equal to 0.45;
  Abbe number (νd) of the glass is larger than or equal to 66; and
  a refractive index (nd) of the glass satisfies an expression (1):

$$nd \geq 2.0614 - 0.0071 \times \nu d \quad (1).$$

According to the above described embodiment, fluorophosphate glass having a high refractive index and low dispersion, and exhibiting excellent thermal stability and suitably suppressed volatility can be achieved.

In another embodiment of the invention, the fluorophosphate glass may further contain:
  $Li^+$ in an amount of 0 to 10 cationic %;
  $Na^+$ in an amount of 0 to 10 cationic %;
  $K^+$ in an amount of 0 to 10 cationic %;
  $Mg^{2+}$ in an amount of 0 to 10 cationic %;
  $Ca^{2+}$ in an amount of 0 to 15 cationic %;
  $Sr^{2+}$ in an amount of 0 to 10 cationic %;
  $Zn^{2+}$ in an amount of 0 to 15 cationic %;
  $La^{3+}$ in an amount of 0 to 3 cationic %;
  $Gd^{3+}$ in an amount of 0 to 3 cationic %;
  $Y^{3+}$ in an amount of 0 to 15 cationic %;
  $Si^{4+}$ in an amount of 0 to 5 cationic %; and
  $B^{3+}$ in an amount of 0 to 5 cationic %.

In yet another embodiment of the invention, liquid phase temperature of the glass may be lower than or equal to 900° C.

In a fourth embodiment of the invention, ΔPg,F of the glass may be larger than or equal to 0.015.

In another embodiment of the invention, the fluorophosphate glass further contains, when expressed in anionic percent, $Cl^-$ to 3.0%.

According to yet another embodiment of the invention, glass material for press molding, made of one of the above described types of fluorophosphate glass, is provided.

In a seventh embodiment of the invention, the glass material for press molding may be formed as a preform for precise press molding (precise-press-molding preform).

According to another embodiment of the invention, there is provided a manufacturing method for a glass molded body. This method includes: mixing glass ingredients to produce one of the above described types of fluorophosphate glass; melting the mixed glass ingredients; pouring continuously molten glass into a casting mold; and picking up continuously molded glass from the casting mold.

According to yet another embodiment of the invention, there is provided a manufacturing method for glass material for press molding. This method includes dividing, grinding, and polishing the glass molded body obtained according to the above described manufacturing method.

According to a tenth embodiment of the invention, there is provided a manufacturing method for glass material for press molding. This method includes: mixing glass ingredients to produce one of the above described types of fluorophosphate glass; melting the mixed glass ingredients; flowing molten glass; separating a molten glass body from the molten glass being flowed; and molding the glass material from the glass body while the molten glass body cools and solidifies.

According to another embodiment of the invention, there is provided an optical element blank to be finished as an optical element, made of one of the above described types of fluorophosphate glass.

According to yet another embodiment of the invention, there is provided a manufacturing method for an optical element blank. This method includes heating and softening one of the above described types of glass material for press molding (or one of the above described glass material for press molding obtained in accordance with one of the above described manufacturing methods), and subjecting the glass material to press molding.

According to a thirteenth embodiment of the invention, there is provided a manufacturing method for an optical element blank. This method includes: mixing glass ingredients to produce one of the above described types of fluorophosphate glass; melting the mixed glass ingredients; flowing molten glass; separating a molten glass body from the molten glass being flowed; and molding the optical element blank from the glass body.

According to another embodiment of the invention, there is provided an optical element, made of one of the above described types of fluorophosphate glass.

According to yet another embodiment of the invention, there is provided a manufacturing method for an optical element. This method includes: grinding and polishing the above described optical element blank (or an optical element blank obtained in accordance with the one of the above described manufacturing methods).

According to a sixteenth embodiment of the invention, there is provided a manufacturing method for an optical element. This method includes heating one of the above described types of glass material for press molding (or glass material obtained in accordance with one of the above described manufacturing methods), and subjecting the glass material to precise press molding with a press mold.

In another embodiment of the invention, the precise press molding part of the manufacturing method includes introducing the glass material for press molding into the press mold, and heating the glass material and the press mold together.

In yet another embodiment of the invention, the precise press molding part of the manufacturing method may further include introducing the glass material for press molding into the press mold which has been preheated, after the glass material is heated.

According to the above described embodiments, optical glass made of fluorophosphate glass having a high refractive index and low dispersion, and exhibiting excellent thermal stability and suitably suppressed volatility, can be achieved. In addition, glass material for press molding and an optical element made of such glass can also be achieved. Further, the manufacturing method for each of the optical glass, the glass material for press molding, and the optical element can be achieved.

Furthermore, according to the above described embodiments, the optical glass and the glass material for press molding exhibiting the excellent moldability for precise press molding can be provided, and the manufacturing methods thereof can be provided. Therefore, it becomes possible to provide the manufacturing method for manufacturing the optical element in high productivity.

Furthermore, according to the above described embodiments, since the optical glass exhibiting excellent workability can be provided, it becomes possible to manufacture the optical element through grinding and polishing in a high productivity condition. When the optical element is manufactured by the precise press molding, the excellent workability of the glass can be utilized, for example, for a centering process.

According to the above described embodiments, since volatility of the molten glass can be suppressed, it becomes possible to prevent occurrence of striaes due to volatilization, and thereby to obtain easily a high-quality glass molded body. Since fluctuation of composition of the molten glass due to volatilization can be suppressed, fluctuation of the optical property such as a refractive index and Abbe number can also be suppressed. Consequently, it becomes possible to mass-produce the fluorophosphate glass having the stable optical property.

DETAILED DESCRIPTION OF EMBODIMENTS

Figure 1:
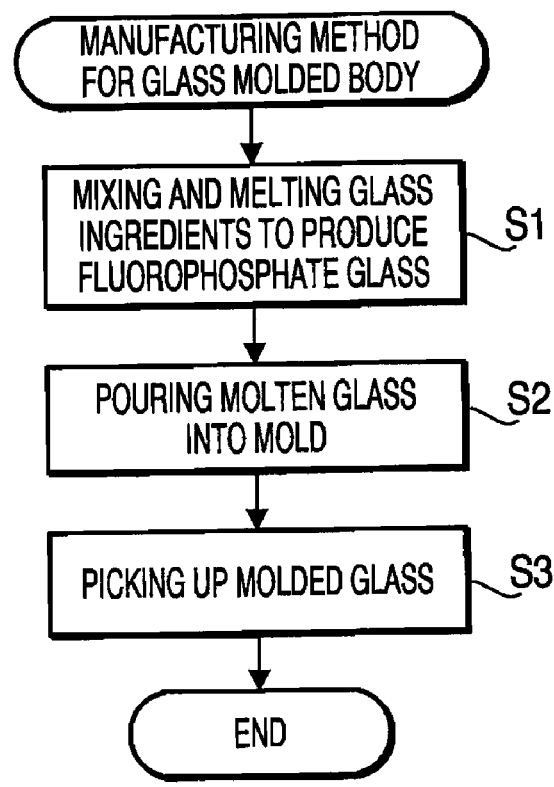
FIG. 1 is a flowchart illustrating a manufacturing method for a glass molded body according to an embodiment of the invention.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Fluorophosphate Glass and Manufacturing Method Thereof

The fluorophosphate glass according to an embodiment of the invention includes:

$P^{5+}$ in an mount of 20 to 45 cationic %;
$Al^{3+}$ in an mount of 15 to 35 cationic %;
$Ba^{2+}$ in an mount of 20 to 50 cationic %;
$F^-$ in an mount of 20 to 50 anionic %; and
$O^{2-}$ in an mount of 50 to 80 anionic %;
wherein:
a molar ratio of $O^{2-}/P^{5+}$ is larger than or equal to 3.5;
a molar ratio of $Al^{3+}/P^{5+}$ is larger than or equal to 0.45;
Abbe number (vd) of the glass is larger than or equal to 66; and
a refractive index (nd) of the glass satisfies an expression (1):

$$nd \geq 2.0614 - 0.0071 \times vd \qquad (1).$$

As used herein, the content of a cationic component and the total content of cationic components are expressed by "cationic percent", and the content of an anionic component and the total content of anionic components are expressed by "anionic percent" unless otherwise specified. Also, the term "cationic percent" as used herein means the number of cations of a particular component with respect to the total number of cations in the glass, expressed in percent. Similarly, the term "anionic percent" as used herein means the number of anions of a particular component with respect to the total number of anions in the glass, expressed in percent.

Hereafter, reasons for the inclusion of various components of the fluorophosphate glass are explained.

$P^{5+}$ is a glass network component. If the content of $P^{5+}$ gets smaller than 20 cationic %, the thermal stability decreases. If the content of $P^{5+}$ gets larger than 45 cationic %, the chemical durability decreases. In a case where the content of $P^{5+}$ is less than 20 cationic % or more than 45 cationic %, it becomes difficult to suppress the volatility in a high temperature state as explained below, or it becomes difficult to maintain the low dispersion and the anomalous dispersion. For this reason, the content of $P^{5+}$ is set to 20 to 45 cationic %. From the above described point of view, the lower limit of $P^{5+}$ of 22 cationic % is suitable, the lower limit of $P^{5+}$ of 25 cationic % is more suitable, and the lower limit of $P^{5+}$ of 30 cationic % is further more suitable. In addition, the upper limit of $P^{5+}$ of 43 cationic % is suitable, the upper limit of $P^{5+}$ of 40 cationic % is more suitable, and the upper limit of $P^{5+}$ of 39 cationic % is further more suitable.

$Al^{3+}$ has functions of enhancing the thermal stability, the chemical durability and workability, and the function of enhancing the refractive index. If the content of $Al^{3+}$ gets smaller than 15 cationic %, it becomes difficult to obtain such advantages. If the content of $Al^{3+}$ gets larger than 35 cationic %, the thermal stability decreases. For this reason, the content of $Al^{3+}$ is set to 15 to 35 cationic %. To enhance the above described advantages achieved by $Al^{3+}$, the content of $Al^{3+}$ of 15 to 33 cationic % is suitable, the content of $Al^{3+}$ of 15 to 30 cationic % is more suitable, the content of $Al^{3+}$ of 17 to 27 cationic % is further more suitable, and the content of $Al^{3+}$ of 17 to 25 cationic % is still furthermore suitable.

$Ba^{2+}$ has the function of increasing the refractive index without losing the thermal stability. If the content of $Ba^{2+}$ gets smaller than 20 cationic %, it becomes difficult to obtain such advantages. If the content of $Ba^{2+}$ gets larger than 50 cationic %, the thermal stability decreases. For this reason, the content of $Ba^{2+}$ is set to 20 to 50 cationic %. From the above described point of view, the lower limit of $Ba^{2+}$ of 22 cationic % is suitable, the lower limit of $Ba^{2+}$ of 25 cationic % is more suitable, the lower limit of $Ba^{2+}$ of 27 cationic % is furthermore suitable, and the lower limit of $Ba^{2+}$ of 30 cationic % is still furthermore suitable. In addition, the upper limit of $Ba^{2+}$ of 47 cationic % is suitable, and the upper limit of $Ba^{2+}$ of 45 cationic % is more suitable.

$F^-$ is an important component for giving the property of anomalous dispersion to the glass, and also has the function of decreasing the glass transition temperature. If the content of $F^-$ gets lower than 20 anionic %, it becomes difficult to obtain such advantages. If $F^-$ gets larger than 50 anionic %, the refractive index decreases, and thereby it becomes difficult to obtain a desired refractive index. For this reason, the content of $F^-$ is set to 20 to 50 anionic %. To enhance the above described advantages achieved by $F^-$, the content of $F^-$ of 22 to 50 anionic % is suitable, the content of $F^-$ of 25 to 50 anionic % is more suitable, the content of $F^-$ of 27 to 50 anionic % is further more suitable, and the content of $F^-$ of 30 to 50 anionic % is still furthermore suitable.

$O^{2-}$ has the function of maintaining the thermal stability. If the content of $O^{2-}$ gets lower than 50 anionic %, the refractive index decreases, and thereby it becomes difficult to obtain a desired refractive index and it becomes difficult to suppress the volatility in a high temperature state as explained below. On the other hand, if the content of $O^{2-}$ gets larger than 80 anionic %, it becomes impossible to contain a desired amount of $F^-$, and thereby it becomes difficult to achieve the desired low dispersion and the anomalous dispersion. For this reason, the content of $O^{2-}$ is set to 50 to 80 anionic %. To further enhance the advantages achieved by $O^{2-}$, the content of $O^{2-}$ of 50 to 78 anionic % is suitable, the content of $O^{2-}$ of 50 to 75 anionic % is more suitable, the content of $O^{2-}$ of 50 to 73 anionic % is further more suitable, and the content of $O^{2-}$ of 50 to 70 anionic % is still furthermore suitable.

In general, phosphate is used as an ingredient of the fluorophosphate glass. However, in order to increase the introduced amount of fluorine ($F^-$) as anionic component, a metaphosphate having a low ratio (oxygen atoms/phosphorous atoms=3) of the number of oxygen atoms ($O^{2-}$) per one phosphorous atom ($P^{5+}$) is typically used as the phosphate.

However, the inventor of the present invention found that when glass is produced with the metaphosphate, the reaction occurs, in the molten glass, between metaphosphoric acid and fluorine originating in the ingredients. Thereby, phosphoryl fluoride ($POF_3$) is produced as a volatile component. By contrast, if a ratio of the number of oxygen atoms ($O^{2-}$) per one phosphorous atom ($P^{5+}$) is adjusted to be larger than or equal to 3.5 (oxygen atoms/phosphorous atom $\geq 3.5$), the amount of the volatile component decreases considerably. The inventor concludes that the reason is that diphosphoric acid having the ratio of the number of oxygen atoms ($O^{2-}$) per one phosphorous atom ($P^{5+}$) equal to 3.5 is more stable than the metaphosphoric acid having the ratio of the number of oxygen atoms ($O^{2-}$) per one phosphorous atom ($P^{5+}$) equal to 3.0.

According to the embodiment, a molar ratio of $O^{2-}/P^{5+}$ (i.e., a molar ratio of the content of $O^{2-}$ with respect to $P^{5+}$) in the fluorophosphate glass is set to a value larger than or equal to 3.5. By setting the molar ratio of $O^{2-}/P^{5+}$ to a value larger than or equal to 3.5, it becomes possible to suppress production of phosphoryl fluoride being a volatile component, and thereby to decrease considerably the volatility of the glass in the high temperate state. By suppressing the volatility, it becomes possible to prevent a surface of glass such as molten glass in the high temperature state from altering its quality, and thereby to prevent occurrence of a surface striae.

Since fluctuation of the glass composition due to volatility can be suppressed, it is also possible to prevent fluctuation of the optical property, such as a refractive index and Abbe number, from occurring. Furthermore, by setting the molar ratio of $O^{2-}/P^{5+}$ to a value larger than or equal to 3.5, it becomes possible to suppress an erosive property of the glass in the molten state, and thereby it becomes possible to suppress erosion of a stirring rod used to homogenize the glass or a melting pot. Therefore, it becomes possible to prevent platinum or platinum-alloy contained in the melting pot or the stirring rod from being mixed into the glass by erosion, and thereby it becomes possible to prevent the quality of the glass from being decreased by the platinum or platinum-alloy mixed into the glass as foreign material.

In order to enhance the thermal stability, the chemical durability and workability of the glass while obtaining a desired refractive index, the molar ratio of $Al^{3+}/P^{5+}$ (i.e., a molar ratio of the content of $Al^{3+}$ with respect to the content of $P^{5+}$) is set to a value larger than or equal to 0.45. If the molar ratio of $Al^{3+}/P^{5+}$ is lower than 0.45, it becomes difficult to achieve both the desired refractive index and the excellent thermal stability, and the chemical durability and workability decrease. However, since the thermal stability decreases when the molar ratio of $Al^{3+}/P^{5+}$ becomes excessively large, it is preferable to set the molar ratio of $Al^{3+}/P^{5+}$ to a value smaller than or equal to 1.0. To further enhance the above described advantages, the molar ratio of $Al^{3+}/P^{5+}$ larger than or equal to 0.47 is preferable, and the molar ratio of $Al^{3+}/P^{5+}$ larger than or equal to 0.50 is more preferable.

In order to provide the glass suitable for correction of the high-order chromatic aberration, Abbe number is set to a value larger than or equal to 66, and the refractive index nd is defined to satisfy the expression (1). By setting the refractive index to fall within the range of the expression (1), it becomes possible to decrease the absolute value of curvature of a lens surface with respect to curvature of a lens surface of a typical lens having the same light-gathering power.

Since precise press molding, grinding, and polishing can be performed more easily for a lens having a lens surface with gentler curvature, it becomes possible to enhance productivity by using glass with a high refractive index. Furthermore, by increasing the refractive index, it becomes possible to provide glass material to be suitably used for an optical element used for a high-performance and compact optical system.

The fluorophosphate glass according to the embodiment may be configured such that the refractive index nd satisfies the following expressions (2) and (3) in the range of Abbe number $vd \geq 66$:

$$nd \geq 2.0664 - 0.0071 \times vd \quad (2); \text{ and}$$

$$nd \geq 2.0714 - 0.0071 \times vd \quad (3).$$

By satisfying the expressions (2) and (3), it becomes possible to suppress the volatility, and to achieve the suitable thermal stability, the chemical durability, the workability, precise press moldability, and the anomalous dispersion.

As described above, the fluorophosphate glass according to the embodiment may be formed of three cationic components of $P^{5+}$, $Al^{3+}$, and $Ba^{2+}$, and two anionic components of $F^-$ and $O^{2-}$. Optionally, the fluorophosphate glass may include other cationic components and other anionic components as described below.

As an example, the fluorophosphate glass may further contain:

$Li^+$ in an amount of 0 to 10 cationic %;
$Na^+$ in an amount of 0 to 10 cationic %;
$K^+$ in an amount of 0 to 10 cationic %;
$Mg^{2+}$ in an amount of 0 to 10 cationic %;
$Ca^{2+}$ in an amount of 0 to 15 cationic %;
$Sr^{2+}$ in an amount of 0 to 10 cationic %;
$Zn^{2+}$ in an amount of 0 to 15 cationic %;
$La^{3+}$ in an amount of 0 to 3 cationic %;
$Gd^{3+}$ in an amount of 0 to 3 cationic %;
$Y^{3+}$ in an amount of 0 to 15 cationic %;
$Si^{4+}$ in an amount of 0 to 5 cationic %; and
$B^{3+}$ in an amount of 0 to 5 cationic %.

This means that at least one of these components may be contained in the glass by the amount defined as above.

$Li^+$, $Na^+$, and $K^+$ have the function of reducing viscosity, and the function of decreasing the glass transition temperature. However, if the content of each of $Li^+$, $Na^+$, and $K^+$ gets larger than 10 cationic %, the thermal stability decreases, and regarding $Na^+$ and $K^+$, the refractive index also decreases. For this reason, the content of each of $Li^+$, $Na^+$, and $K^+$ is set to 0 to 10 cationic %. Regarding the content of each of $Li^+$, $Na^+$, and $K^+$, the range of 0 to 7 cationic % is suitable, the range of 0 to 5 cationic % is more suitable, the range of 0 to 3 cationic % is further more suitable. The glass not containing $Li^+$, the glass not containing $Na^+$, or the glass not containing $K^+$ is still further more suitable.

$Mg^{2+}$ has the function of enhancing the workability and the thermal stability. However, if the content of $Mg^{2+}$ gets larger than 10 cationic %, the refractive index decreases. For this reason, the content of $Mg^{2+}$ is set to the range of 0 to 10 cationic %. The content of $Mg^{2+}$ of 0 to 7 cationic % is suitable, the content of $Mg^{2+}$ of 0 to 5 cationic % is more suitable, the content of $Mg^{2+}$ of 0 to 3 cationic % is further more suitable, and content of $Mg^{2+}$ of 0 to 1 cationic % still more suitable.

$Ca^{2+}$ has the function of enhancing the workability and the thermal stability. However, if the content of $Ca^{2+}$ gets larger than 15 cationic %, the refractive index decreases. For this reason, the content of $Ca^{2+}$ is set to the range of 0 to 15 cationic %. The content of $Ca^{2+}$ of 0 to 14 cationic % is suitable, the content of $Ca^{2+}$ of 0 to 13 cationic % is more suitable, the content of $Ca^{2+}$ of 0 to 12 cationic % is further more suitable, and content of $Ca^{2+}$ of 0 to 10 cationic % still more suitable.

$Sr^{2+}$ has the function of increasing the refractive index. However, if the content of $Sr^{2+}$ gets larger than 10 cationic %, the thermal stability of the glass decreases. For this reason, the content of $Sr^{2+}$ is set to the range of 0 to 10 cationic %. The content of $Sr^{2+}$ of 0 to 8 cationic % is suitable, the content of $Sr^{2+}$ of 0 to 7 cationic % is more suitable, the content of $Sr^{2+}$ of 0 to 6 cationic % is further more suitable, and content of $Sr^{2+}$ of 0 to 5 cationic % still more suitable.

$Zn^{2+}$ has the function of enhancing the thermal stability while maintaining the refractive index. However, if the content of $Zn^{2+}$ gets larger than 15 cationic %, the dispersion of the glass increases, and thereby it becomes difficult to obtain the required optical performance. For this reason, the content of $Zn^{2+}$ is set to the range of 0 to 15 cationic %. The content of $Zn^{2+}$ of 0 to 15 cationic % is suitable, the content of $Zn^{2+}$ of 0 to 14 cationic % is more suitable, the content of $Zn^{2+}$ of 0 to 13 cationic % is further more suitable, and content of $Zn^{2+}$ of 0 to 12 cationic % still more suitable, and the content of $Zn^{2+}$ of 0 to 10 cationic % is still more suitable.

$La^{3+}$ has the function of increasing the refractive index. However, if the content of $La^{3+}$ gets larger than 3 cationic %, the thermal stability decreases. For this reason, the content of $La^{3+}$ is set to the range of 0 to 3 cationic %. The content of $La^{3+}$ of 0 to 2 cationic % is suitable, the content of $La^{3+}$ of 0 to 1 cationic % is more suitable, and the content of $La^{3+}$ of 0 cationic % (i.e., not containing $La^{3+}$) is further more suitable.

$Gd^{3+}$ has the function of increasing the refractive index. However, if the content of $Gd^{3+}$ gets larger than 3 cationic %, the thermal stability decreases. For this reason, the content of $Gd^{3+}$ is set to the range of 0 to 3 cationic %. The content of $Gd^{3+}$ of 0 to 2 cationic % is suitable, the content of $Gd^{3+}$ of 0 to 1 cationic % is more suitable, and the content of $Gd^{3+}$ of 0 cationic % (i.e., not containing $Gd^{3+}$) is further more suitable.

$Y^{3+}$ has the function of increasing the refractive index while maintaining the thermal stability. However, if the content of $Y^{3+}$ gets larger than 15 cationic %, the thermal stability decreases. For this reason, the content of $Y^{3+}$ is set to the range of 0 to 15 cationic %. The content of $Y^{3+}$ of 0 to 14 cationic % is suitable, the content of $Y^{3+}$ of 0 to 13 cationic % is more suitable, and the content of $Y^{3+}$ of 0 to 12 cationic % is further more suitable, the content of $Y^{3+}$ of 0 to 11 cationic % is still more suitable, and the content of $Y^{3+}$ of 0 to 10 cationic % is still more suitable.

$Si^{4+}$ can be contained in the glass by a small amount. However if the content of $Si^{4+}$ gets larger than 5 cationic %, the melting property and the thermal stability of the glass deteriorate. For this reason, the content of $Si^{4+}$ is set to 0 to 5 cationic %. The content of $Si^{4+}$ of 0 to 3 cationic % is suitable, the content of $Si^{4+}$ of 0 to 1 cationic % is more suitable, and the content of $Si^{4+}$ of 0 cationic % (i.e., not containing $Si^{4+}$) is further more suitable.

$B^{3+}$ can be contained in the glass by a small amount. However, if the content of $B^{3+}$ gets larger than 5 cationic %, the melting property and the thermal stability of the glass deteriorate. For this reason, the content of $B^{3+}$ is set to 0 to 5 cationic %. The content of $B^{3+}$ of 0 to 3 cationic % is suitable, the content of $B^{3+}$ of 0 to 1 cationic % is more suitable, and the content of $B^{3+}$ of 0 cationic % (i.e., not containing $B^{3+}$) is further more suitable.

In order to increase the refractive index and enhance workability and thermal stability, it is preferably that the total content of $P^{5+}$, $Al^{3+}$, $Ba^{2+}$, $Mg^{2+}$, $Ca^{2+}$, $Sr^{2+}$, $Zn^{2+}$, and $Y^{3+}$ is set to a value larger than or equal to 90 cationic %. The total content of these ingredients larger than or equal to 95 cationic % is more preferable. The total content of these ingredients larger than or equal to 98 cationic % is further more preferable. The total content of these ingredients larger than or equal to 99 cationic % is further more preferable. The total content of these ingredients of 100 cationic % is still more suitable.

Although both of $Mg^{2+}$ and $Ca^{2+}$ have the function of enhancing the workability and thermal stability, $Ca^{2+}$ exhibits the property of being less prone to decreasing the refractive index in compassion with $Mg^{2+}$. In this point of view, it is preferable that the total content of $P^{5+}$, $Al^{3+}$, $Ba^{2+}$, $Ca^{2+}$, $Sr^{2+}$, $Zn^{2+}$, and $Y^{3+}$ is set to a value larger than or equal to 90 cationic %. The total content of these ingredients larger than or equal to 95 cationic % is more suitable. The total content of these ingredients larger than or equal to 98 cationic % is further more suitable. The total content of these ingredients larger than or equal to 99 cationic % is further more suitable. The total content of these ingredients of 100 cationic % is still more suitable.

By containing $Cl^-$ of 0 to 3.0 anionic percent in the glass, it becomes possible to prevent the upward leaking of molten glass on the outer surface of the pipe. Thereby, it becomes possible to prevent the quality of the glass from decreasing due to upward leaking of the molten glass when the molten glass flows to the outside from the pipe. Furthermore, $Cl^-$ serves as a defoaming agent. However, if $Cl^-$ is contained excessively in the glass, problems concerning volatilization and erosion of the melting facility are caused. For this reason, the content of $Cl^-$ of 0 to 2.0 anionic % is suitable, and the content of $Cl^-$ of 0 to 0.1 anionic % is more suitable.

Optionally, $Sb^{3+}$ or $Ce^{4+}$ serving as a clarifying agent may be added to the glass. Preferably, the total content of the clarifying agent is larger than or equal to 0 cationic % and smaller than 1 cationic %.

It is preferable that components having an adverse environmental effect (e.g., Pb, Cd, As, Th, and Cs) are not contained in the glass. The fluorophosphate glass formed not to contain a coloring agent has a property of achieving high transmissivity over the wide range in the visible region. For this reason, it is preferable that the glass is formed not to contain any coloring agents. Examples of such coloring agents include Cu, Co, Ni, Fe, and Cr.

Since Hf, Ga, Ge, Te, and Tb are both unnecessary components and expensive components, it is preferable that Hf, Ga, Ge, Te, and Tb are not contained in the glass.

The fluorophosphate glass according to the invention has the excellent thermal stability As such, the fluorophosphate glass is able to achieve a liquid phase temperature lower than or equal to 900° C., and preferably a liquid phase temperature lower than or equal to 880° C. Since glass having a low liquid phase temperature is able to decrease the flowing temperature of the glass, it becomes possible to adjust the viscosity of the glass to a suitable state without losing clarity of the glass.

The fluorophosphate glass according to the invention has positive anomalous dispersion. The anomalous dispersion can be expressed quantitatively by $\Delta Pg,F$. By using refractive indexes ng, nF, and nc respectively corresponding to g-line, F-line and c-line, partial dispersion ratio Pg,F can be expressed by (ng−nF)/(nF−nc).

When the partial dispersion on the normal line serving as a reference to normal partial dispersion glass in a graph representing the relationship between the partial dispersion ratio Pg,F and Abbe number νd is defined as $Pg,F^{(O)}$, $Pg,F^{(O)}$ can be expressed by a equation indicated below by using Abbe number νd:

$$Pg,F^{(O)} = 0.6483 - (0.0018 \times \nu d).$$

$\Delta Pg,F$ is a deviation of the partial dispersion ratio Pg,F from the above described normal line, and is expressed by an expression indicated below:

$$\Delta Pg, F = Pg, F - Pg, F^{(O)}$$
$$= Pg, F + (0.0018 \times \nu d) - 0.6483.$$

From a point of view of anomalous dispersion, the fluorophosphate glass having $\Delta Pg,F$ larger than or equal to 0.015 is preferable, the glass having $\Delta Pg,F$ larger than or equal to 0.018 is more preferable, and the glass having $\Delta Pg,F$ larger than or equal to 0.020 is further more preferable. By giving such an anomalous dispersion property to the glass, it becomes possible to provide the glass more suitable for correction of the high-order chromatic aberration.

The fluorophosphate glass according to the invention can be produced by mixing, melting and molding glass ingredients to obtain a desired property in predetermined composition. The fluorophosphate glass according to the invention can be used suitably for optical glass, and a general manufacturing method for optical glass can be used for manufacturing of the fluorophosphate glass.

Namely, regarding a manufacturing method of the fluorophosphate glass where glass ingredients are heated and melted, it is preferable to use at least phosphate, fluoride, and an alkali earth metal compound to obtain the fluorophosphate glass according to the invention. It is also preferable to mix the glass ingredients while suppressing the mass ratio of carbonate in the alkali earth metal compound to a value smaller than or equal to 30%, and then to heat and melt the glass ingredients obtained by the mixing in the melting pot.

The fluorophosphate glass according to the invention is formed to have the molar ratio of $O^{2-}/P^{5+}$ larger than or equal to 3.5. Therefore, it is required to include a relatively large amount of $O^{2-}$ in the glass with respect to a required amount of $P^{5+}$. Even if a metaphosphate ingredient is employed, the molar ratio of $O^{2-}/P^{5+}$ merely becomes 3, and it is impossible to increase the molar ratio of $O^{2-}/P^{5+}$ to a value larger than or equal to 3.5.

As an ingredient to include $O^{2-}$ in the glass other than the metaphosphate, a carbonate ingredient can be used. For example, since the fluorophosphate glass according to the invention contains a relatively large amount of $Ba^{2+}$, it becomes easy to increase the molar ratio of $O^{2-}/P^{5+}$ by employing barium carbonate. However, since the barium carbonate has a relatively high decomposition temperature, the barium carbonate does not decompose completely at the melting temperature of the glass, but decomposes at clarification temperature. Therefore, in this case, $CO_2$ gas tends to remain in the glass as air bubbles or dissolved gas. The dissolved gas may cause deterioration of quality of glass by separating out from the glass when the glass is rapidly cooled down or when the glass is stimulated, for example, by stirring.

For this reason, by mixing the glass ingredients while suppressing the mass ratio of carbonate in the alkali earth compound to a value smaller than or equal to 30% and heating and melting the glass ingredients obtained by the mixing, it becomes possible to decrease the air bubbles and dissolved gas of $CO_2$ gas, and thereby to enhance the quality of the glass. In order to further decrease the air bubbles and dissolved gas of $CO_2$ gas and to enhance the quality of the glass, it is preferable to suppress the mass ratio of carbonate in the alkali earth compound to a value smaller than or equal to 20%. The mass ratio of carbonate smaller than or equal to 10% is more preferable, the mass ratio of carbonate smaller than or equal to 5% is further more preferable, and the mass ratio of carbonate of 0% (i.e., not employing the carbonate) is still more preferable. Since BaO has hygroscopicity, BaO is not suitable for the case where precise weighing and mixing should be conducted to control precisely an optical property. Therefore, it is preferable that BaO is not used as an ingredient.

It is preferable that the fluorophosphate glass according to the invention has Abrasion (FA) lower than or equal to 600. Abrasion lower than or equal to 580 is more preferable, Abrasion lower than or equal to 550 is further more suitable, and Abrasion lower than or equal to 500 is still more suitable. That is, the glass according to the invention has a relatively small Abrasion as fluorophosphate glass. Therefore, since the glass does not wear excessively when the glass is processed (e.g., by grinding or polishing), it becomes possible to achieve precise processing of surfaces. Such a property is utilized when various types of optical elements made of fluorophosphate glass according to the invention, such as various lenses (e.g., spherical lenses) and prisms, are produced by grinding or polishing.

It is preferable that the fluorophosphate glass according to the invention has a Knoop hardness number larger than or equal to 300 MPa. A Knoop hardness number larger than or equal to 320 MPa is more preferable, and a Knoop hardness number larger than or equal to 340 MPa is further more suitable. That is, the glass according to the invention has a sufficient Knoop hardness number as fluorophosphate glass. Therefore, the glass resists damage with respect to processing, such as grinding and polishing.

As described above, the fluorophosphate glass according to the invention has a relatively low Abrasion and a large Knoop hardness number. Therefore, the fluorophosphate glass according to the invention has excellent workability. Such properties of the glass according to the invention are conveniently utilized not only for manufacturing of optical elements and preforms for precise press molding having precisely processed surfaces and having no flaws, but such properties are also utilized for centering of such a lens manufactured by the precise press molding. In this specification, "a preform for precise press molding" refers to "a precise-press-molding preform".

Glass Material for Press Molding, a Manufacturing Method thereof, and a Manufacturing Method of a Glass Molded Body Hereafter, glass material for press molding according to the invention is described. The glass material for press molding according to the invention is made of the above described fluorophosphate glass according to the invention. The glass material for press molding means a glass body which is heated for press molding. A glass body having the mass corresponding to the mass of a press molding product, such as a preform for precise press molding or a glass gob for press molding, is an example of glass material for press molding.

Examples of Glass Material for Precise Press Molding

The preform for precise press molding (hereafter, frequently referred to as a preform) means a glass preform to be subjected to the precise press molding while being heated. The precise press molding is so-called mold optics molding, and is performed such that an optical function surface of an optical element is formed by transferring a molding surface of the press mold to the optical element. The optical function surface means an optical surface having a refracting function, a reflecting function, a diffracting function, or a function of allowing an incident beam to enter thereto.

In order to prevent reaction and fusion-bonding of the glass and a press molding surface during the precise press molding and to enable the glass to suitably extend along the molding surface, it is preferable that a surface of the preform is covered with a mold-releasing film. Various types of mold-releasing films can be used. For example, noble metals (e.g., platinum or platinum-alloy), oxides (e.g., oxide of Si, Al, Zr, La or Y), nitrides (e.g., nitride of B, Si, or Al), fluorides (e.g., fluoride of Mg), and carbon containing films can be used.

As a carbon-containing film, a film containing carbon as a primary component (i.e., a film whose content of carbon is larger than content of another component when the content of the film is denoted in atomic percent) is preferable. For example, a carbon film or a carbon-hydrogen film can be used. As a film formation method for a carbon-containing film, a vacuum deposition process, a sputtering process, an ion plating process, or a thermal decomposition process with material gas, such as hydrocarbons can be used. For formation of another film, a deposition process, a sputtering process, an ion plating process or a sol-gel process can be used.

Examples of How to Manufacture a Preform

A first example of a method of manufacturing of the preform is a method of forming a preform by separating a predetermined amount of a molten glass body from molten glass, and cooling the glass body to from a preform having the same mass as the mass of the molten glass body. For example, glass ingredients are melted, clarified, and homogenized to prepare homogeneous molten glass, so as to let the molted glass flow out from a flow nozzle or a flow pipe which is made of platinum or platinum-alloy and for which temperature control has been performed.

For molding a small preform or a spherical preform, a required amount of molten glass is dropped from the flow nozzle as a drop of molten glass, and the drop of molten glass is received by a preform mold to form a preform. Alternatively, a drop of molten glass having a required amount is dropped into liquid nitrogen to form a preform.

For formation of a medium size preform or a large size preform, the molten glass is flowed from the flow pipe, and a tip portion of the flowing molten glass is received by a preform mold. Then, after a constriction is formed between the nozzle of the flowing molten glass and the preform mold, the preform mold is dropped rapidly in a straight line so that the molten glass is separated at the constriction by the surface tension and that a molten glass body having a desired amount is received by a receiving member to form a preform.

For manufacturing a preform having a smooth surface (e.g., a free surface) not having flaws, stains, creases, and surface deterioration, a method where a preform is formed while floating a molten glass body over a preform mold by applying a wind pressure to the molten glass body, or a method where a preform is formed by dropping a drop of molten glass in a liquid medium which is obtained by cooling the gaseous matter which is in a gaseous state at room temperature can be employed.

When the preform is manufactured by floating the molten glass body, gas (hereafter, frequently referred to as floating gas) is blown to the molten glass body so as to apply the wind pressure to the molten glass body. In this case, if the viscosity of the molten glass body is too low, the floating gas enters into the molten glass body and remains in the molten glass body as air bubbles. By contrast, by setting the viscosity of the molten glass body to 3 to 60 dPa·s, it becomes possible to float the glass body without allowing the floating gas to enter the glass body. As gas to be blown to the preform as floating gas, air, $N_2$ gas, $O_2$ gas, Ar gas, He gas, or steam can be used. The intensity of the surface pressure is not limited to a particular range as long as the preform can be floated without letting the preform contact a solid matter, such as a surface of a mold.

Since, in many cases, precise press molded products (e.g., optical elements) formed of the preform are elements having a rotationally symmetric axis (e.g., a lens), it is preferable that the shape of the preform has a rotationally symmetric axis. For example, the shape of the preform is a sphere or a shape having a single rotationally symmetric axis. As an example of a shape having a single rotationally symmetric axis, a shape whose cross section including the rotationally symmetric axis has a smooth contour line without edges and recesses (e.g., the shape having the shorter axis defined in the above described cross section coinciding with the rotationally asymmetric axis), or a shape obtained by flattening a sphere (i.e., a shape obtained by defining a single rotationally symmetric axis passing through a sphere and contracting the sphere in the axis direction) can be used.

A second example of manufacturing of the preform is performed as follows. First, uniform molten glass is molded while being entered into a casting mold, and thereafter distortion of the molded body is corrected by annealing. Then, after cutting or splitting the molded body into a plurality of glass pieces each having a predetermined size and shape, each glass piece is polished so that the surface of each glass pieces is smoothed and each glass pieces forms the preform having a predetermined mass. It is preferable that the surface of the thus formed preform is covered with a carbon-containing film.

A glass gob for press molding for an optical element blank (glass material) is a glass body used to form, by press molding, an optical element blank to be finished as an optical element. The optical element blank has a shape defined by adding a processing margin to be removed by grinding or polishing to the shape of a targeted optical element.

A first example of manufacturing the glass gob is as follows. First, homogeneous molten glass is molded while being entered into a casting mold, and thereafter distortion of the molded body is corrected by annealing. Then, after cutting or splitting the molded body into a plurality of glass pieces each having a predetermined size and shape, each glass piece is subjected to barrel polishing so that each edge on the glass pieces is rounded, and the mass of the glass gob is adjusted to have the same mass as the mass of the optical element blank. The glass gob after the barrel polishing has a rough surface on which a powdery mold-release agent to be applied to the surface of the glass gob can be applied uniformly in a relatively easy manner.

A second example of manufacturing of the glass gob is as follows. A tip of the flowing molten glass is received by a gob mold, and a constriction is formed at an intermittent position of the flowing molten glass. Then, the gob mold is rapidly dropped down in a straight line so that the molten glass is separated from the constriction by the surface pressure. After thus obtaining the glass body having a required mass on the gob mold, gas is blown to the glass body so as to float the glass body while applying the wind pressure to the glass body upward, and thereby to form the glass gob. After subjecting the thus obtained glass body to annealing, the glass body is subjected to the barrel polishing to form the glass gob having a required mass.

Referring to FIG. 1, a manufacturing method of a glass molded body according to the invention is shown. In this method of manufacturing, a glass molded body is made by successively pouring the molten glass into the casting mold and picking up the glass molded body successively from the casting mold. In addition, the glass ingredients are mixed so that the fluorophosphate glass according to the invention can be obtained. The glass ingredients mixed as described above are melted, and then, as shown in steps S1 to S3, the molten glass is molded. As an example of manufacturing of the glass molded body, the manufacturing method of the molded body in the above described second example of manufacturing of the preform or the above described first example of manufacturing of the glass gob can be used. Various types of casing molds can be used.

Figure 2:
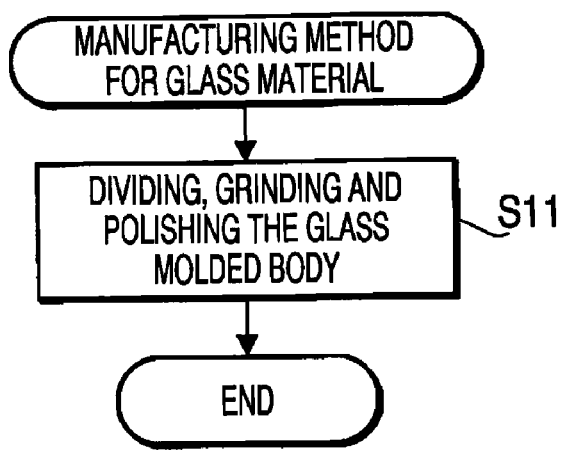
FIG. 2 is a flowchart illustrating a manufacturing method for glass material according to an embodiment of the invention.

Referring to FIG. 2, a first manufacturing method of glass material for press molding is shown. In step S11 of this method, the glass molded body manufactured by the above described manufacturing method of FIG. 1 is divided, grinded, and polished.

Figure 3:
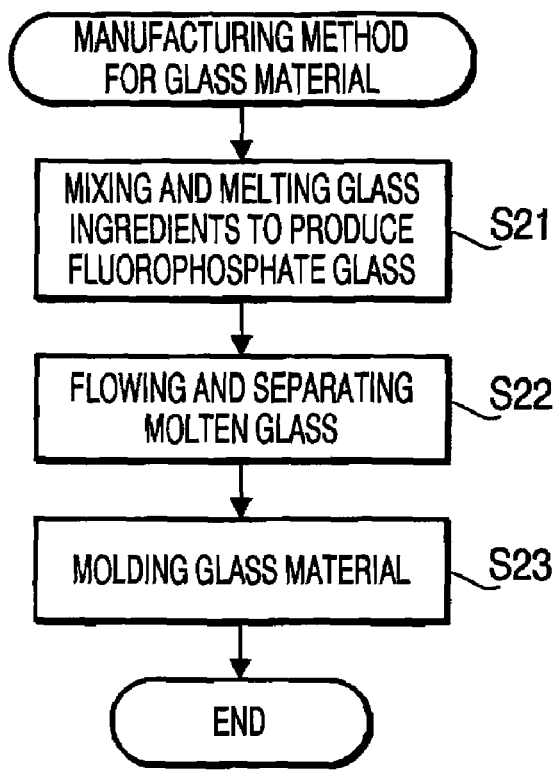
FIG. 3 is a flowchart illustrating another manufacturing method for glass material according to an embodiment of the invention.

Referring to FIG. 3, a second manufacturing method of glass material for press molding is shown. This method of manufacturing glass material for press molding includes flowing molten glass, separating a molten glass body from the flowing molten glass, and thereafter forming the glass material for press molding in a process in which the glass body is cooled and solidified. In steps S21 to S23 of this method, the glass ingredients are mixed so that the fluorophosphate glass according to the invention can be obtained, the glass ingredients mixed as described above are melted, and then the molten glass is molded.

As an example of the second manufacturing method of glass material for press molding, the above described first example of manufacturing of the preform or the above described second example of manufacturing of the glass gob can be used.

An Optical Element Blank and a Manufacturing Method Thereof

An optical element blank according to the invention is finished through grinding and polishing to form an optical element, and is made of the above described fluorophosphate glass according to the invention.

The optical element blank is a glass molded body having a shape formed by adding a grinding margin and a polishing margin to a shape of a targeted optical element, and the optical element blank preferably has a shape similar to the shape of the targeted optical element. It is preferable that, because an optical function surface is finished by grinding and polishing, the optical element blank is targeted for an optical element whose optical function surface is a flat surface or a spherical surface. As preferable examples of such an optical element blank, a blank for a spherical lens and a blank for a prism are provided.

In order to prevent damage during grinding or polishing, it is preferable that the optical element blank has been subjected to annealing to reduce distortion. It is also possible to form an optical element blank having an optical property precisely matching desired values by finely adjusting the optical property, such as a refractive index and Abbe number, through annealing.

Examples of How to Manufacture the Optical Element Blank

Figure 4:
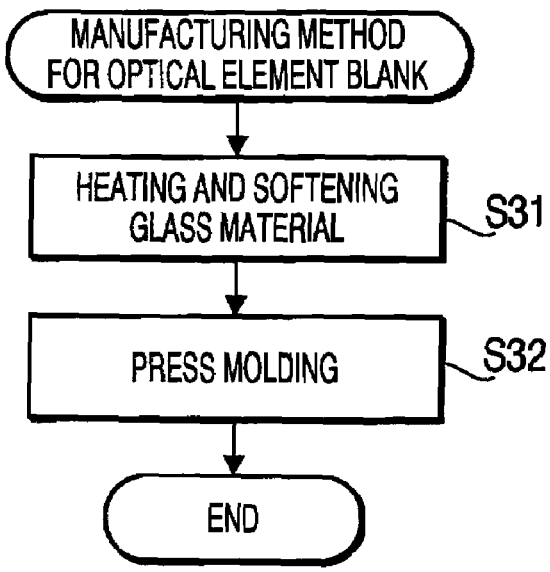
FIG. 4 is a flowchart illustrating a manufacturing method for an optical element blank according to an embodiment of the invention.

Referring to FIG. 4, a first example of a manufacturing method for the optical element blank according to the invention is shown. In steps S31 to S32 of this method, the above described glass material for press molding according to the invention (or the glass material for press molding manufactured by one of the above described methods) is heated, softened, and press molded. A powdery mold-releasing agent such as boron nitride is applied uniformly to a surface of the glass material for press molding, and is heated until the glass is softened. Then, the glass is introduced to the press mold to perform the press molding. Next, the press molded product is picked up from the mold, and, through annealing, distortion is corrected and the optical property such as a refractive index is adjusted to have a desired value.

Figure 5:
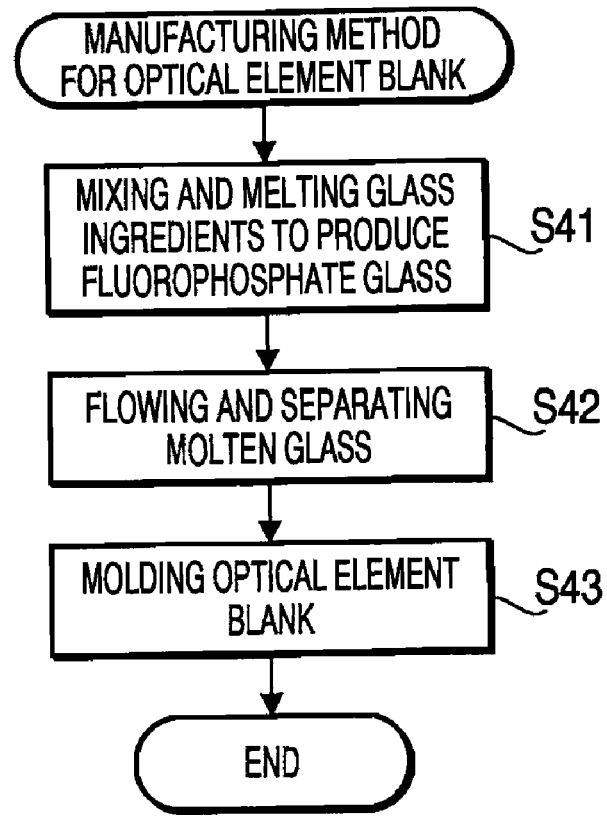
FIG. 5 is a flowchart illustrating another manufacturing method for an optical element blank according to an embodiment of the invention.

Referring to FIG. 5, a second example of a manufacturing method for the optical element blank according to the invention is shown. In steps S41 to S43 of this method, glass ingredients are mixed to obtain the fluorophosphate glass according to the invention, molten glass obtained by melting the glass ingredients is flowed, a molten glass body is separated, and then the molten glass body is press molded. First, homogenized molten glass is flowed on a surface of a lower mold on which a powdery mold-releasing agent such as boron nitride has been applied uniformly, and an intermittent portion of the flowing molten glass whose lower end is supported on the lower mold is cut with a cutting edge which is so-called shear. Thus, the molten glass body having the desired mass is obtained on the lower mold.

Next, the lower mold on which the molten glass body is placed is moved to a position beneath an upper mold, and the molten glass body is pressed by the upper mold and the lower mold to form a shape of the optical element blank. Then, a press molded product is picked up, and, through annealing, distortion is corrected and the optical property such as a refractive index is adjusted to have a desired value.

The above described two manufacturing methods can be performed in the atmospheric air. Various molding conditions, press molds having various types of materials, various types of heating and softening pots, and various types of pans on which the glass gob is placed during heating or softening can be employed.

An Optical Element and a Manufacturing Method Thereof

An optical element according to the invention is made of fluorophosphate glass. For example, lenses such as an aspherical surface lens, a spherical surface lens, a plano-concave lens, a plano-convex lens, a biconcave lens, a biconvex lens, a convex-meniscus lens, a concave-meniscus lens, a microlens, a lens array, a lens with a diffraction grating, a prism, and a prism with a lens function are provided. On a surface of such an optical element, an antireflection coating or a wavelength-selective partial reflection film may be provided.

Since the optical element according to the invention is made of glass having the lower dispersion and the anomalous partial dispersion, it is possible to correct the high-order chromatic aberration by combination with another type of optical element made of another type of glass. Furthermore, since the optical element according to the invention has a relatively high refractive index as low dispersion glass, it becomes possible to decrease the absolute value of curvature of an optical function surface of a lens, and thereby it becomes possible to downsize an optical system by using the optical element according to the invention in the optical system, such as a image pick-up optical system or a projection optical system.

Examples of How to Manufacture the Optical Element

Figure 6:
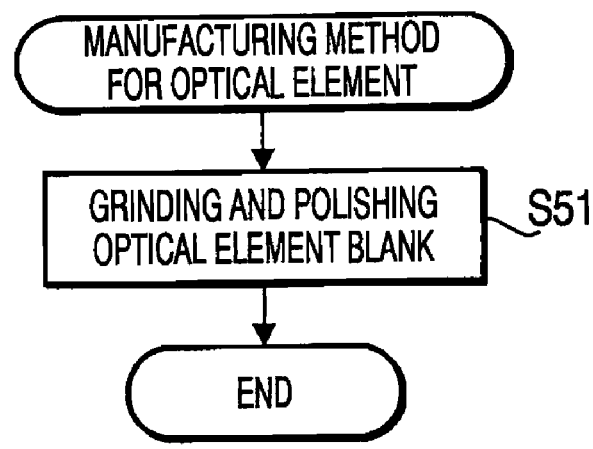
FIG. 6 is a flowchart illustrating a manufacturing method for an optical element according to an embodiment of the invention.

Referring to FIG. 6, a first example of a manufacturing method of the optical element according to the invention is shown. In step S51 of this method, the above described optical element blank (or the optical element blank manufactured according to the invention) is grinded and polished. Various types of grinding processes and polishing processes can be employed. The method can be used preferably in manufacturing an optical element having a plane optical function surface or a spherical optical function surface, such as a spherical lens or a prism.

Figure 7:
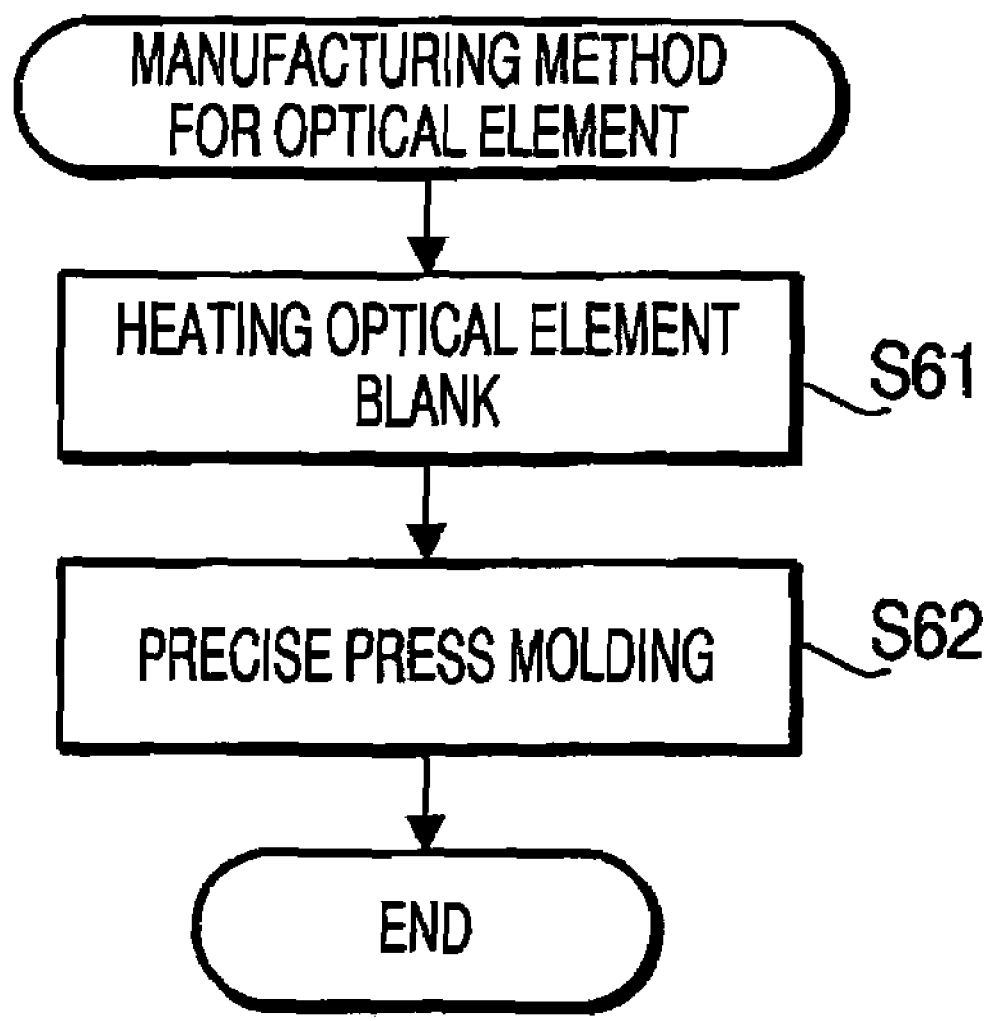
FIG. 7 is a flowchart illustrating another manufacturing method for an optical element according to an embodiment of the invention.

Referring to FIG. 7, a second example of a manufacturing method of the optical element according to the invention is shown. In steps S61 to S62 of this method, the above described glass material for press molding (or the glass material for press molding manufactured by the method according to the invention) is heated, and is subjected to the precise press molding with a press mold.

It is preferable that the heating and pressing process for the press mold and the glass material for press molding are performed under atmosphere of nonoxide gas, such as mixed gas of nitrogen gas and hydrogen gas in order to prevent a mold-releasing film provided on the molding surface of the press mold or the molded surface from being oxidized.

Under atmosphere of nonoxide gas, the carbon-containing film covering the surface of the preform is not oxidized, and the film remains on the surface of the molded product which has been subjected to the precise press molding. The carbon-containing film should be removed eventually. It is possible to remove the carbon-containing film relatively easily and completely, by heating the precise press molded product under oxidizing atmosphere, such as atmospheric air. Oxidizing and removing of the carbon-containing film should be performed at the temperature at which the precise press molded product is not deformed by heating. More specifically, it is preferable that the oxidizing and removing of the carbon-containing film are performed in the temperature range lower than the glass transition temperature.

In the precise press molding, a press mold having a molding surface which has been finely processed to have a desired shape is used. However, a mold-releasing film may be formed on the molding surface so as to prevent fusion bonding of glass during the pressing process. As a mold-releasing agent, a carbon-containing film, a nitride film, or a noble metal film can be used. As a carbon-containing film, a hydrogenated carbon film or a carbon film can be used preferably. In the precise press molding, a preform is supplied to a position between a pair of upper and lower molds facing with each other. The upper and lower molds have molding surfaces whose shapes have been precisely processed. Subsequently, both of the molds and the preform are heated to the temperature corresponding to the viscosity of glass of $10^5$ to $10^9$ dPa·s so as to soften the preform, and the prefrom is subjected to the pressure molding so as to precisely transfer the molding surface of the mold to the glass.

It is also possible to precisely transfer the molding surface of the mold to the glass by supplying a preform which has been heated in advance to the temperature corresponding to the viscosity of the glass of $10^4$ to $10^8$ dPa·s to the position between a pair of upper and lower molds of which molding surfaces have been precisely processed and which face with each other, and then subjecting the preform to the pressure molding.

Appropriate pressure and time period for pressing can be determined by considering various factors, such as viscosity of glass. For example, the pressure of approximately 5 to 15 MPa and the pressing time period of 10 to 300 seconds may be employed. Pressing condition such as pressure and a time period may be determined in accordance with the shape and the size of the molded product.

Subsequently, the mold and the precise press molded product are cooled, and are removed with respect to each other to pick up the precise press molded product, preferably at the temperature lower than or equal to the distortion temperature. In order to precisely adjust the optical property to a desired value, a condition of the annealing process for the molded product during cooling, such as an annealing speed, may be adjusted appropriately.

The above described second manufacturing method of the optical element can be grouped generally to the following two methods.

The first method is a method where the glass material for press molding is introduced to the press mold, the glass material and the press mold are heated together to perform the precise press molding. The first method is recommended for the case where the molding accuracy such as surface accuracy and decentering accuracy of the optical element is emphasized.

The second method is a method where, after the glass material for press molding is heated, the glass material is introduced to a preheated press mold to perform the precise press molding. The second method is recommended for the case where the productivity is emphasized.

The optical element according to the invention may be manufactured without being subjected to the press molding. For example, a glass block is molded by introducing homogenized molten glass into a casting mold, and, through annealing, distortion is removed and the optical property is adjusted so that the refractive index becomes a desired value by adjusting the annealing condition. Then, the glass block is cut and split to make glass pieces, and the glass piece is grinded and polished to be finished as an optical element.

EXAMPLES OF THE PRESENT INVENTION

Hereafter, examples of various embodiments of the present invention are described. However, it should be noted that the present invention is not limited to these examples.

First Example

To achieve glass composition shown in Tables 1 to 3, various ingredients such as metaphosphate, fluoride and oxide are used, the ingredients are weighed, and the ingredients are mixed sufficiently. Then, the mixed ingredients are placed into a platinum melting pot, and are heated and melted. After melting, the molten glass is flowed into to a casting mold, and is cooled to the temperature near the glass transition temperature, and is immediately moved to an annealing furnace to perform the annealing for approximately one hour under the glass transition temperature range. Then, the glass is cooled in the furnace to the room temperature. Consequently, a plurality of pieces of optical glass No. 1 to 13 are obtained.

When an observer has inspected each obtained glass in an enlarged view with an optical microscope, the observer did not found separation of a crystal, foreign materials such as platinum particles, air bubbles and striaes. Each of Tables 1, 2, and 3 shows the property of each optical glass obtained as described above. Carbonate is not used as an ingredient of glass No. 1 to 13.

The properties of the glass are measured in accordance with the following manners.

(1) Refractive Indexes nd, ng, nF, nc, and Abbe Number vd

Refractive indexes nd, ng, nF, nc, and Abbe number vd are measured in accordance with the refractive index measuring method of JOGIS (Japanese Optical Glass Industrial Standard).

(2) Deviation ΔPg,F From the Normal Line of the Partial Dispersion Ration

The deviation ΔPg,F is calculated from partial dispersion ratio Pg,F$^{(O)}$ obtained from Abbe number and the partial dispersion ration Pg,F obtained from refractive indexes ng, nF, and nc.

(3) Liquid Phase Temperature

The liquid phase temperature is measured by holding the glass for two hours in a furnace which has been heated to a predetermined temperature, and, after cooling, inspecting the glass with a microscope of a magnification of 100 times. The temperature shown in the column "liquid phase temperature" in Tables 1, 2, and 3 means that separation of a crystal is not observed after two hours holding in the furnace at the temperature and that the liquid phase temperature is lower than or equal to the temperature shown in the Tables.

(4) Glass Transition Temperature Tg

Glass transition temperature is measured with a DSC (Differential Scanning Calorimeter) considering the heating-up speed as 10° C. per minute.

(5) Abrasion $F_A$

A test sample of glass (a glass sample) is held on a cast-iron flat plate rotating horizontally at the speed of 60 revolutions per minute at the position shifted by 80 mm from the center of the plate, and the glass sample is lapped while supplying lapping liquid, obtained by adding water of 20 ml to alumina abrasive grains having an average grain diameter of 20 μm, to the glass sample uniformly for five minutes, and applying the load of 9.807 N. By weighing the mass of the sample after lapping, the abraded mass "m" is obtained. Similarly, the abraded mass "mo" of a standard sample (BSC7) designated in Japanese Optical Glass Manufacture's Society is measured, and Abrasion $F_A$ is calculated by an expression:

$$FA=[(m/d)/(mo/do)] \times 100;$$

where d denotes the relative gravity of targeted glass, and do denotes the relative gravity of the standard sample.

(6) Knoop Hardness Number $H_K$

On a polished flat surface of glass, a recess is formed by applying load of 0.9807 N on a diamond quadrangular pyramid having a rhombic lateral cross section with vertex angels of 172° 30' and 130° for 15 seconds. Then, the longer diagonal line of the thus formed permanent recess is measured, and Knoop hardness number $H_K$ is calculated by an expression:

$$HK=1.451 \times (F/l^2)$$

where F denotes the load (N), and 1 denotes the length of the longer diagonal line of the permanent recess (mm).

TABLE 1

| | | No. | | | | |
|---|---|---|---|---|---|---|
| | | 1 | 2 | 3 | 4 | 5 |
| Cation Component (Cationic Percent) | $P^{5+}$ | 35.00 | 40.00 | 39.70 | 35.00 | 35.00 |
| | $Al^{3+}$ | 27.00 | 22.00 | 22.37 | 22.00 | 22.00 |
| | $Ba^{2+}$ | 38.00 | 38.00 | 37.93 | 38.00 | 38.00 |
| | $Li^+$ | 0.00 | 0.00 | 0.00 | 0.00 | 0.00 |
| | $Na^+$ | 0.00 | 0.00 | 0.00 | 0.00 | 0.00 |
| | $K^+$ | 0.00 | 0.00 | 0.00 | 0.00 | 0.00 |
| | $Mg^{2+}$ | 0.00 | 0.00 | 0.00 | 0.00 | 0.00 |
| | $Ca^{2+}$ | 0.00 | 0.00 | 0.00 | 0.00 | 5.00 |
| | $Sr^{2+}$ | 0.00 | 0.00 | 0.00 | 0.00 | 0.00 |
| | $Zn^{2+}$ | 0.00 | 0.00 | 0.00 | 0.00 | 0.00 |
| | $La^{3+}$ | 0.00 | 0.00 | 0.00 | 0.00 | 0.00 |
| | $Gd^{3+}$ | 0.00 | 0.00 | 0.00 | 0.00 | 0.00 |
| | $Y^{3+}$ | 0.00 | 0.00 | 0.00 | 0.00 | 0.00 |
| | $Si^{4+}$ | 0.00 | 0.00 | 0.00 | 0.00 | 0.00 |
| | $B^{3+}$ | 0.00 | 0.00 | 0.00 | 5.00 | 0.00 |
| | Total Cationic Percent | 100.00 | 100.00 | 100.00 | 100.00 | 100.00 |
| Anion Component (Anionic Percent) | $O^{2-}$ | 60.39 | 69.10 | 74.09 | 75.94 | 69.13 |
| | $F^-$ | 39.61 | 30.50 | 25.51 | 23.66 | 30.47 |
| | $Cl^-$ | 0.00 | 0.40 | 0.40 | 0.40 | 0.40 |
| | Total Anionic Percent | 100.00 | 100.00 | 100.00 | 100.00 | 100.00 |
| $O^{2-}/P^{5+}$ | | 3.57 | 3.50 | 3.67 | 4.10 | 3.83 |
| $Al^{3+}/P^{5+}$ | | 0.77 | 0.55 | 0.56 | 0.63 | 0.63 |
| Refractive Index nd | | 1.56104 | 1.57664 | 1.58921 | 1.60593 | 1.58720 |
| Abbe number νd | | 72.96 | 70.58 | 69.08 | 66.66 | 69.16 |
| $2.0614 - 0.0071 \times νd$ | | 1.5434 | 1.5603 | 1.5709 | 1.5881 | 1.5704 |
| ΔPg, F. | | 0.015 | 0.018 | 0.015 | 0.021 | 0.018 |
| Liquid Phase Temperature LT (° C.) | | ≦880 | ≦850 | ≦900 | ≦900 | ≦850 |
| Glass Transition Temperature Tg (° C.) | | 560 | 551 | 576.9 | 601 | 574.1 |
| Abrasion $F_A$ | | — | — | — | — | — |
| Knoop hardness number | | — | — | — | — | — |

TABLE 2

| | | No. | | | | |
|---|---|---|---|---|---|---|
| | | 6 | 7 | 8 | 9 | 10 |
| Cation Component (Cationic Percent) | $P^{5+}$ | 40.00 | 33.50 | 35.00 | 34.00 | 34.00 |
| | $Al^{3+}$ | 17.00 | 22.00 | 22.00 | 22.00 | 20.00 |
| | $Ba^{2+}$ | 38.00 | 38.00 | 38.00 | 38.00 | 38.00 |
| | $Li^+$ | 0.00 | 0.00 | 0.00 | 0.00 | 2.00 |
| | $Na^+$ | 0.00 | 0.00 | 0.00 | 0.00 | 0.00 |
| | $K^+$ | 0.00 | 0.00 | 0.00 | 0.00 | 0.00 |
| | $Mg^{2+}$ | 0.00 | 0.00 | 0.00 | 0.00 | 0.00 |
| | $Ca^{2+}$ | 0.00 | 6.50 | 5.00 | 5.00 | 0.00 |
| | $Sr^{2+}$ | 0.00 | 0.00 | 0.00 | 1.00 | 0.00 |
| | $Zn^{2+}$ | 5.00 | 0.00 | 0.00 | 0.00 | 6.00 |
| | $La^{3+}$ | 0.00 | 0.00 | 0.00 | 0.00 | 0.00 |
| | $Gd^{3+}$ | 0.00 | 0.00 | 0.00 | 0.00 | 0.00 |
| | $Y^{3+}$ | 0.00 | 0.00 | 0.00 | 0.00 | 0.00 |
| | $Si^{4+}$ | 0.00 | 0.00 | 0.00 | 0.00 | 0.00 |
| | $B^{3+}$ | 0.00 | 0.00 | 0.00 | 0.00 | 0.00 |
| | Total Cationic Percent | 100.00 | 100.00 | 100.00 | 100.00 | 100.00 |
| Anion Component (Anionic Percent) | $O^{2-}$ | 69.18 | 69.12 | 70.60 | 69.02 | 69.13 |
| | $F^-$ | 30.42 | 30.48 | 29.00 | 30.58 | 30.47 |
| | $Cl^-$ | 0.40 | 0.40 | 0.40 | 0.40 | 0.40 |
| | Total Anionic Percent | 100.00 | 100.00 | 100.00 | 100.00 | 100.00 |
| $O^{2-}/P^{5+}$ | | 3.45 | 3.94 | 3.87 | 3.90 | 3.85 |
| $Al^{3+}/P^{5+}$ | | 0.43 | 0.66 | 0.63 | 0.65 | 0.59 |

TABLE 2-continued

| | No. | | | | |
|---|---|---|---|---|---|
| | 6 | 7 | 8 | 9 | 10 |
| Refractive Index nd | 1.58231 | 1.59097 | 1.59192 | 1.59020 | 1.59373 |
| Abbe number vd | 68.75 | 69.12 | 68.75 | 68.95 | 67.78 |
| 2.0614 − 0.0071 × vd | 1.5733 | 1.5706 | 1.5733 | 1.5719 | 1.5802 |
| ΔPg, F. | 0.021 | 0.026 | 0.023 | 0.026 | 0.023 |
| Liquid Phase Temperature LT (° C.) | ≦830 | ≦900 | ≦880 | ≦880 | ≦850 |
| Glass Transition Temperature Tg (° C.) | 520 | 585.9 | 583.5 | 583 | 547.9 |
| Abrasion $F_A$ | — | — | 450 | — | — |
| Knoop hardness number | — | — | 370 | — | — |

TABLE 3

| | | No. | | |
|---|---|---|---|---|
| | | 11 | 12 | 13 |
| Cation Component (Cationic Percent) | $P^{5+}$ | 35.00 | 35.00 | 35.00 |
| | $Al^{3+}$ | 18.75 | 19.25 | 19.00 |
| | $Ba^{2+}$ | 38.00 | 38.00 | 38.00 |
| | $Li^+$ | 0.00 | 0.00 | 0.00 |
| | $Na^+$ | 0.00 | 0.00 | 0.00 |
| | $K^+$ | 0.00 | 0.00 | 0.00 |
| | $Mg^{2+}$ | 0.00 | 0.00 | 0.00 |
| | $Ca^{2+}$ | 0.00 | 0.00 | 5.00 |
| | $Sr^{2+}$ | 0.00 | 0.00 | 0.00 |
| | $Zn^{2+}$ | 5.00 | 5.00 | 0.00 |
| | $La^{3+}$ | 0.00 | 0.00 | 0.00 |
| | $Gd^{3+}$ | 0.00 | 0.00 | 0.00 |
| | $Y^{3+}$ | 3.25 | 2.75 | 3.00 |
| | $Si^{4+}$ | 0.00 | 0.00 | 0.00 |
| | $B^{3+}$ | 0.00 | 0.00 | 0.00 |
| | Total Cationic Percent | 100.00 | 100.00 | 100.00 |
| Anion Component (Anionic Percent) | $O^{2-}$ | 69.13 | 71.13 | 59.70 |
| | $F^-$ | 30.47 | 28.47 | 39.90 |
| | $Cl^-$ | 0.40 | 0.40 | 0.40 |
| | Total Anionic Percent | 100.00 | 100.00 | 100.00 |
| | $O^{2-}/P^{5+}$ | 3.83 | 3.89 | 3.50 |
| | $Al^{3+}/P^{5+}$ | 0.54 | 0.55 | 0.54 |
| Refractive Index nd | | 1.59672 | 1.60118 | 1.56859 |
| Abbe number vd | | 67.12 | 67.02 | 71.52 |
| 2.0614 − 0.0071 × vd | | 1.5848 | 1.5865 | 1.5536 |
| ΔPg, F | | 0.018 | 0.027 | 0.029 |
| Liquid Phase Temperature LT(° C.) | | ≦850 | ≦850 | ≦800 |
| Glass Transition Temperature Tg(° C.) | | 564.3 | 575.1 | 522.6 |
| Abrasion $F_A$ | | 480 | 450 | 580 |
| Knoop hardness number | | 345 | 360 | 325 |

Second Example

The glass ingredients (not containing carbonate) mixed to obtain each optical glass described in First Example are melted, clarified and homogenized to form molten glass, a drop of molten glass is dropped from the platinum nozzle to be received on a prefrom mold, and a spheric preform made of various types of glass is formed by floating the drop of molten glass by applying the wind pressure thereto.

A preform made of various types of glass can be formed by continuously flowing the above described molten glass from the platinum pipe, receiving a lower end of the flowing molten glass on a preform mold, making a constriction at a portion of the flowing molten glass, and dropping the preform mold rapidly in a straight line to separate the molten glass at the position of the constriction. Further, the separated molten glass body is received on the preform mold, and then the preform is formed by floating the molten glass body by applying the wind pressure thereto. The observer did not find devitrification, striaes, foreign materials, and air bubbles in the thus obtained preform.

Third Example

A plurality of glass pieces are formed by introducing the continuously flowing molten glass (which is prepared in accordance with Second Example) to form a glass block, annealing the glass block, and thereafter cutting the glass block. The preform made of various types of glass is manufactured by grinding and polishing each glass piece. The observer did not find devitrification, striaes, foreign materials, and air bubbles in the inside of the thus obtained optical block (i.e., a portion to be used for the preform).

Since the thus obtained preform has a relatively low Abrasion and a relatively high Knoop hardness number as fluorophosphate glass, Abrasion during a process such as polishing is low, and therefore it is possible to enhance the surface processing accuracy and to prevent flaws from remaining on the surface of the preform.

Fourth Example

A plurality of glass pieces are formed by introducing the continuously flowing molten glass (which is prepared in accordance with Second Example) to form a glass block, annealing the glass block, and thereafter cutting the glass block. Then, a glass gob for press molding is formed by subjecting each glass piece to the barrel polishing.

Fifth Example

Various types of lenses for various types of glass (e.g., an aspherical biconvex meniscus lens, an aspherical biconcave meniscus lens, an aspherical biconvex lens, and an aspherical biconcave lens) are formed by coating the carbon-containing film on the surface of the preform obtained in accordance with the Second or Third Example, introducing the preform into a press mold including upper and lower molds and a body mold made of SiC having the molding surface covered with the carbon-containing film, heating the mold and the preform together in the nitrogen atmosphere to soften the preform, and thereafter subjecting the preform to the precise press molding.

The various types of glass thus obtained may be subjected to the centering process on an as needed basis. Since the thus obtained lens is made of glass having a relatively low Abrasion and a relatively large Knoop hardness number as fluorophosphate glass, the abrasion during the centering is low, and it becomes possible to enhance the surface processing accuracy and to prevent flaws from remaining on the surface of the preform.

Sixth Example

Various types of lens blanks (e.g., a spherical convenx meniscus lens, a spherical concave meniscus lens, a spherical biconvex lens, and a spherical biconcave lens) are formed by applying the powdery mold-releasing agent made of boron nitride on the surface of the glass gob formed in accordance with Fourth Example to soften the glass gob, and thereafter subjecting the glass gob to the press molding with the mold. Thus, the lens blanks formed by the various types of glass are manufactured.

Seventh Example

Various types of lens blanks (e.g., a spherical convex meniscus lens, a spherical concave meniscus lens, a spherical biconvex lens, and a spherical biconcave lens) are formed by flowing the molten glass prepared in accordance with the Second Example, cutting the flowing molten glass with a shear to separate a molten glass body, and subjecting the glass body to the press molding with the press mold. Thus, the lens blanks formed of the various types of glass are manufactured.

Eighth Example

Various types of lenses (e.g., a spherical convex meniscus lens, a spherical concave meniscus lens, a spherical biconvex lens, and a spherical biconcave lens) are formed by subjecting the lens blank made in accordance with the Sixth or Seventh Example to the annealing process to remove the distortion and to adjust the refractive index to a desired value, and grinding and polishing the lens blank. The lenses made of the various types of glass are thus obtained.

No new matter was added by any of the above amendments.

Ninth Example

Various types of spherical lenses and prisms are manufactured by flowing the molten glass prepared in accordance with the Second Example, introducing the flowing molten glass into the casting mold to form a glass block, and cutting, grinding and polishing the block.

Since each optical element thus obtained is made of glass having a relatively low Abrasion and a relatively high Knoop hardness number as fluorophosphate glass, it becomes possible to enhance the surface processing accuracy and to prevent flaws from remaining on the surface of the lens or prism.

INDUSTRIAL APPLICABILITY

The fluorophosphate glass according to the invention has low dispersion and a high refractive index, is suited correction for the high-order chromatic aberration, and is suitably used for glass material for press molding such as a preform for the precise press molding, an optical element blank and an optical element.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

What is claimed is:

1. A fluorophosphate glass comprising:
    the following cations:
        $P^{5+}$ in an amount of 20 to 45 cationic %;
        $Al^{3+}$ in an amount of 15 to 35 cationic %;
        $Ba^{2+}$ in an amount of 20 to 50 cationic %; and
        $B^{3+}$ in an amount of 0 to 5 cationic %; and
    the following anions:
        $F^-$ in an amount of 20 to 50 anionic %; and
        $O^{2-}$ in an amount of 50 to 80 anionic %;
    wherein:
        a molar ratio of $O^{2-}/P^{5+}$ is larger than or equal to 3.50;
        a molar ratio of $Al^{3+}/P^{5+}$ is larger than or equal to 0.45;
        Abbe number (vd) of the glass is larger than or equal to 66;
        a refractive index (nd) of the glass satisfies an expression (1):

$$nd \geq 2.0614 - 0.0071 \times vd \qquad (1); \text{ and}$$

the fluorophosphate glass does not contain Cu in an amount by which Cu serves as a coloring agent.

2. The fluorophosphate glass according to claim 1, further comprising:
    the following cations:
        $Li^+$ in an amount of 0 to 10 cationic %;
        $Na^+$ in an amount of 0 to 10 cationic %;
        $K^+$ in an amount of 0 to 10 cationic %;
        $Ng^{2+}$ in an amount of 0 to 10 cationic %;
        $Ca^{2+}$ in an amount of 0 to 15 cationic %;
        $Sr^{2+}$ in an amount of 0 to 10 cationic %;
        $Zn^{2+}$ in an amount of 0 to 15 cationic %;
        $La^{3+}$ in an amount of 0 to 3 cationic %;
        $Gd^{3+}$ in an amount of 0 to 3 cationic %;
        $Y^{3+}$ in an amount of 0 to 15 cationic %; and
        $Si^{4+}$ in an amount of 0 to 5 cationic %.

3. The fluorophosphate glass according to claim 1; wherein liquid phase temperature of the glass is lower than or equal to 900° C.

4. The fluorophosphate glass according to claim wherein ΔPg,F of the glass is larger than or equal to 0.015.

5. The fluorophosphate glass according to claim 1, further comprising:
    $Cl^-$ in an amount of 0 to 3.0 anionic %.

6. A glass material for press molding, made of fluorophosphate glass according to claim 1.

7. The glass material for press molding according to claim 6;
    wherein the glass material for press molding is formed as a preform for precise press molding.

8. An optical element blank to be finished as an optical element, made of fluorophosphate glass according to claim 1.

9. An optical element, made of fluorophosphate glass according to claim 1.

10. A manufacturing method for an optical element, comprising:
    a heating step where the glass material for press molding according to claim 7 is heated; and
    a precise press molding step where the glass material is subjected to precise press molding with a press mold.

11. The manufacturing method according to claim 10; wherein the precise press molding step includes:
    introducing the glass material for press molding into the press mold; and
    heating the glass material and the press mold together.

12. The manufacturing method according to claim 10; wherein the precise press molding step includes:
    introducing the glass material for press molding into the press mold which has been preheated, after the glass material is heated.

* * * * *